(12) United States Patent
Norell et al.

(10) Patent No.: US 6,698,595 B2
(45) Date of Patent: Mar. 2, 2004

(54) SCREEN MATERIAL

(75) Inventors: Robert G. Norell, Brighton, MN (US); Stephen A. Uban, Stillwater, MN (US)

(73) Assignee: Weatherford/Lamb, Inc., Houston, TX (US)

(*) Notice: Subject to any disclaimer, the term of this patent is extended or adjusted under 35 U.S.C. 154(b) by 100 days.

(21) Appl. No.: 10/123,660

(22) Filed: Apr. 16, 2002

(65) Prior Publication Data

US 2002/0175120 A1 Nov. 28, 2002

Related U.S. Application Data

(60) Provisional application No. 60/284,955, filed on Apr. 19, 2001.

(51) Int. Cl.[7] .......................... B01D 29/05; B01D 29/48; B01D 29/54
(52) U.S. Cl. .......................... 210/499; 210/162; 210/488; 210/497.01; 210/497.1; 29/896.62
(58) Field of Search .................................. 210/499, 162, 210/488, 497.01, 497.1; 29/896.62; 166/231

(56) References Cited

U.S. PATENT DOCUMENTS

| | | | |
|---|---|---|---|
| 4,657,079 A | 4/1987 | Nagaoka | 166/231 |
| 4,742,872 A | 5/1988 | Geske | 166/231 |
| 4,818,403 A | 4/1989 | Nagaoka | 210/488 |
| 5,387,340 A | 2/1995 | Ackerman | 210/497.01 |

FOREIGN PATENT DOCUMENTS

EP     0 548 910 A1     6/1993     E21B/43/08

*Primary Examiner*—David Reifsnyder
(74) *Attorney, Agent, or Firm*—Moser, Patterson & Sheridan, L.L.P.

(57) ABSTRACT

A screen material having a flexible member. The screen material includes closely spaced filter wires supported by a plurality of support members. A stranded cable is used as the support members to provide flexibility to the screen material. The filter wires are welded to the members and define filter gaps between adjacent filter wires to allow liquid and small particles to pass through, while retaining particles too large to fit through the filter gaps.

53 Claims, 6 Drawing Sheets

SCREEN MATERIAL

This application claims the benefit of prior filed co-pending provisional patent application No. 60/284,955 filed on Apr. 19, 2001.

BACKGROUND AND SUMMARY OF THE INVENTION

The present invention relates to a screen material for filtering various products or retaining solid filter media. Particularly, the present invention relates to a filtering material used in various applications such as water filtration, the production of oil and gas, sugar processing, etc.

A conventional screen material used in oil and gas production, water filtration, sugar processing, etc., typically includes a filter wire spirally wrapped around a series of rigid rods formed in a cylinder. The wrapped wire and/or supporting rods may have a triangular- or other-shaped profile. The filter wire is typically wrapped around the rigid longitudinal rods so that consecutive windings of the wire are spaced sufficiently close together to form a filter gap between the consecutive windings. The filter gap retains a predetermined particle size, but allows fluid and very small particles to pass.

Triangular-shaped, as well as round, profile filter wire is often utilized in conventional screen material. As described above, a triangular-shaped, or round, profile filter wire is spirally wrapped around a series of rigid longitudinal rods. The resulting cylinder can be used as-is or split or cut along its length between two of the rigid longitudinal rods. Once split, the cylinder can then be opened and rolled into a flat sheet of screen material having the rigid rods running parallel to each other in one direction and the triangular- or other-shaped profile filter wire laying generally perpendicularly across the rigid rods to form a grid-like structure. In this way, sheets of the filtering material can be made and used for various purposes. This filter wire screen material and the method of manufacturing it are known to those of ordinary skill in the art.

Among other things, multiple segments of conventional screen material may have to be employed for certain configurations of filters where the rigidity of conventional screen material does not permit a single screen portion to be molded to serve the particular purpose. A screen material that incorporates the filtering benefits known in conventional screens, including filter wire screens, and which is flexible would be welcomed by users of such screen material.

According to the present invention, a screen material comprises a plurality of long, thin, spaced-apart filter members and a plurality of long, thin, spaced-apart support members coupled transversely to the filter members. At least one of the group comprising a filter member and a support member of the screen material is elastically deformable.

DETAILED DESCRIPTION OF THE DRAWINGS

Figure 1:
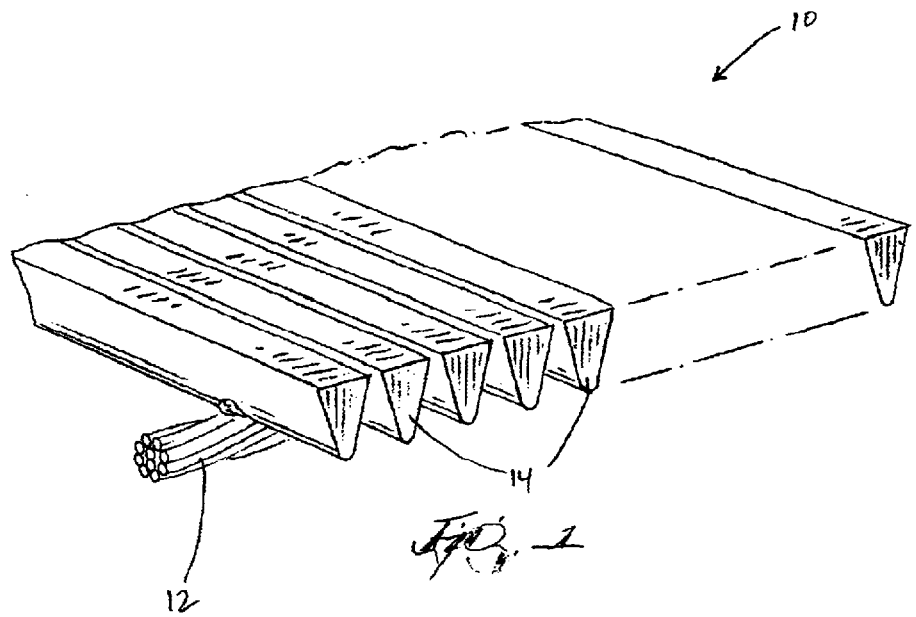
FIG. 1 illustrates a perspective view of a sheet of screen material according to the present invention including triangular-shaped profile filter wires spaced closely together and coupled substantially perpendicularly over a series of underlying, supporting, flexible, stranded cables.

Referring to FIG. 1, a screen material 10, according to a preferred embodiment of the present invention, includes a plurality of stranded cables 12 coupled to a plurality of filter wires 14 positioned substantially perpendicularly across the cables 12. The stranded cables 12 are elastically deformable or flexible by ordinary force from the hands of a person. Therefore, the screen material 10 can be shaped, by hand, in the direction in which the cables 12 run.

Figure 2:
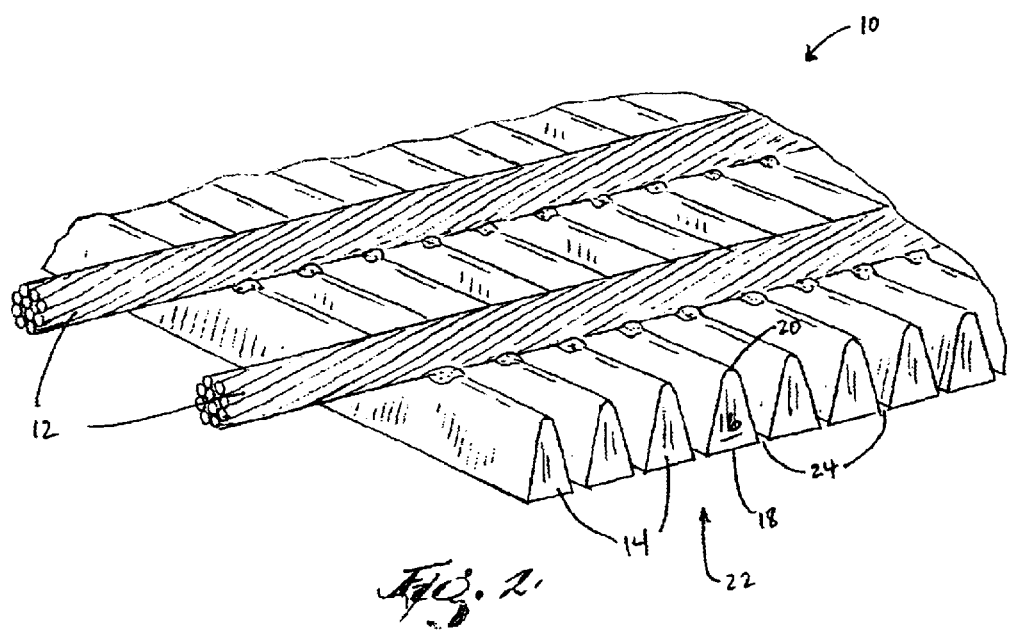
FIG. 2 illustrates a perspective view of the opposite side of the screen material of FIG. 1, showing the supporting stranded cables positioned substantially perpendicularly to the triangular-shaped profile filter wires.

Referring to FIGS. 1 and 2, it can be seen that the filter wires 14 have a substantially triangular-shaped profile 16. Each wire 14 includes a top face 18 and a tip 20 opposite the top face 18. When the filter wires 14 are positioned side-by-side, the top faces 18 of the filter wires 14 create a filtering surface 22 having filter gaps 24 between the adjacent filter wires 14.

The screen material 10 is formed by positioning the plurality of stranded cables 12 parallel to each other in the form of a cylinder (not shown). The stranded cables 12 provide a support structure (support members) around which a filter wire is wrapped. The filter wire may be any suitable wire known to those of ordinary skill in the art. In a preferred embodiment, as discussed above, a triangular-shaped profile filter wire 14 is used. However, any shaped cross-section (e.g., round, square, etc.) may be used. A length of the filter wire 14 is spirally wrapped around the supporting stranded cables 12. The triangular-shaped profile filter wire 14 is wrapped so that consecutive windings of the wire are spaced closely together and form a filtering gap between them, which allows certain flow there through, but retains particles of a predetermined size. The triangular-shaped profile filter wire 14 is positioned so that the tip 20 of the triangular profile filter wire 14 intersects the supporting stranded cables 12 and top face 18 of the triangular profile filter wire 14 forms a filtering surface 22 around the supporting stranded cables 12. At each of the locations where the tip 20 of the filter wire 14 intersects one of the supporting stranded cables 12, the filter wire 14 is welded to the stranded cable 12.

After the cylinder (again, not shown) has been formed with the filter wire 14 wrapped around the series of supporting stranded cables 12, the cylinder may be used as-is or may be cut or split lengthwise through the wrapped profile filter wire 14 and between two adjacent stranded cables 12, and rolled out flat. The resulting sheet of screen material 10 will be relatively rigid in the direction of the rigid triangular-shaped profile filter wires 14, but flexible in the direction of the stranded cable 12 and can be easily shaped in this direction.

Figure 3:
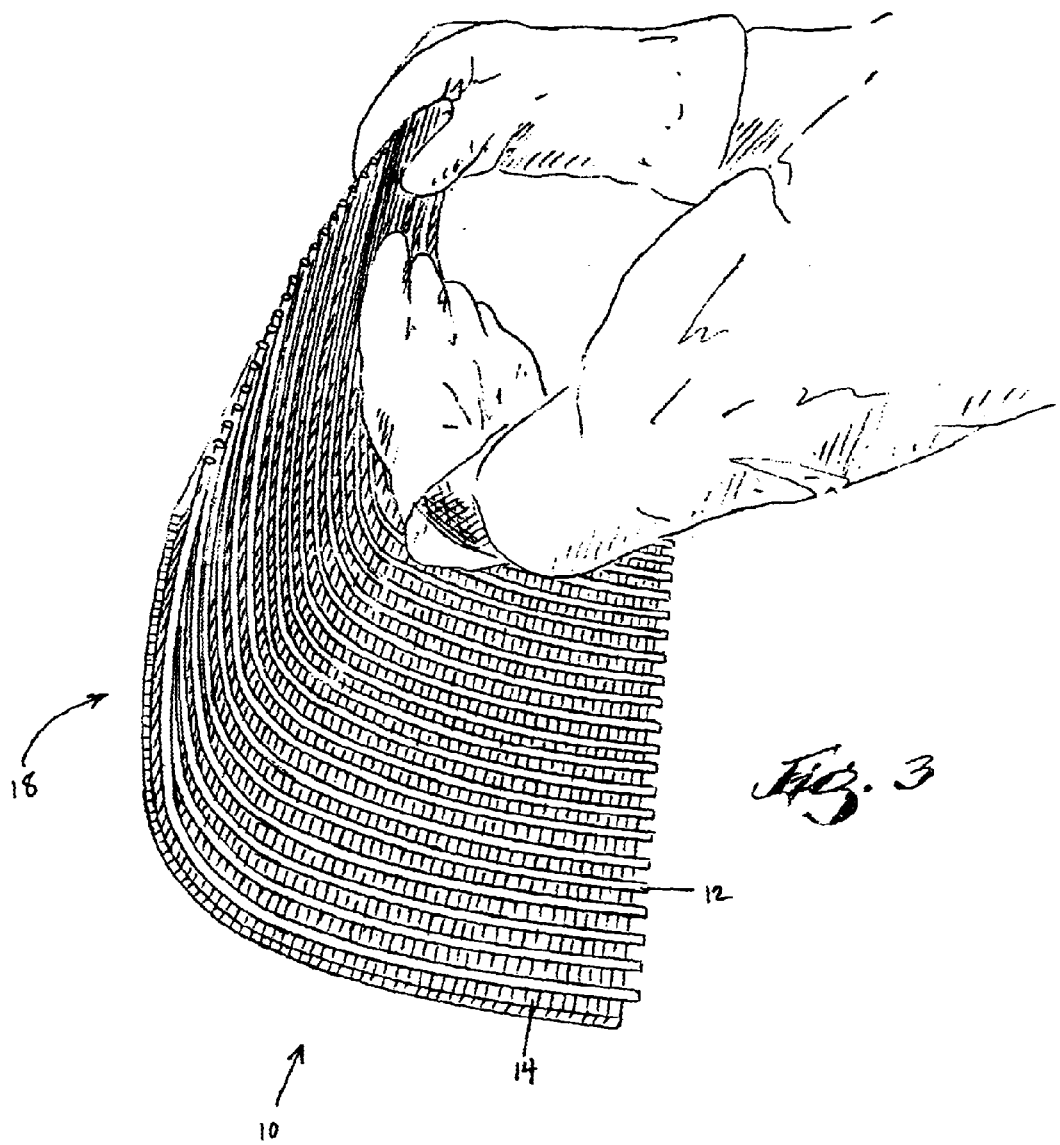
FIG. 3 is a perspective view illustrating a sheet of the screen material of FIG. 1 being shaped by hand into a generally cylindrical form wherein the filter wires run longitudinally to form an exterior filtering surface of the cylinder being formed and the stranded cable runs circumferentially around an interior of the cylinder.
Figure 4:
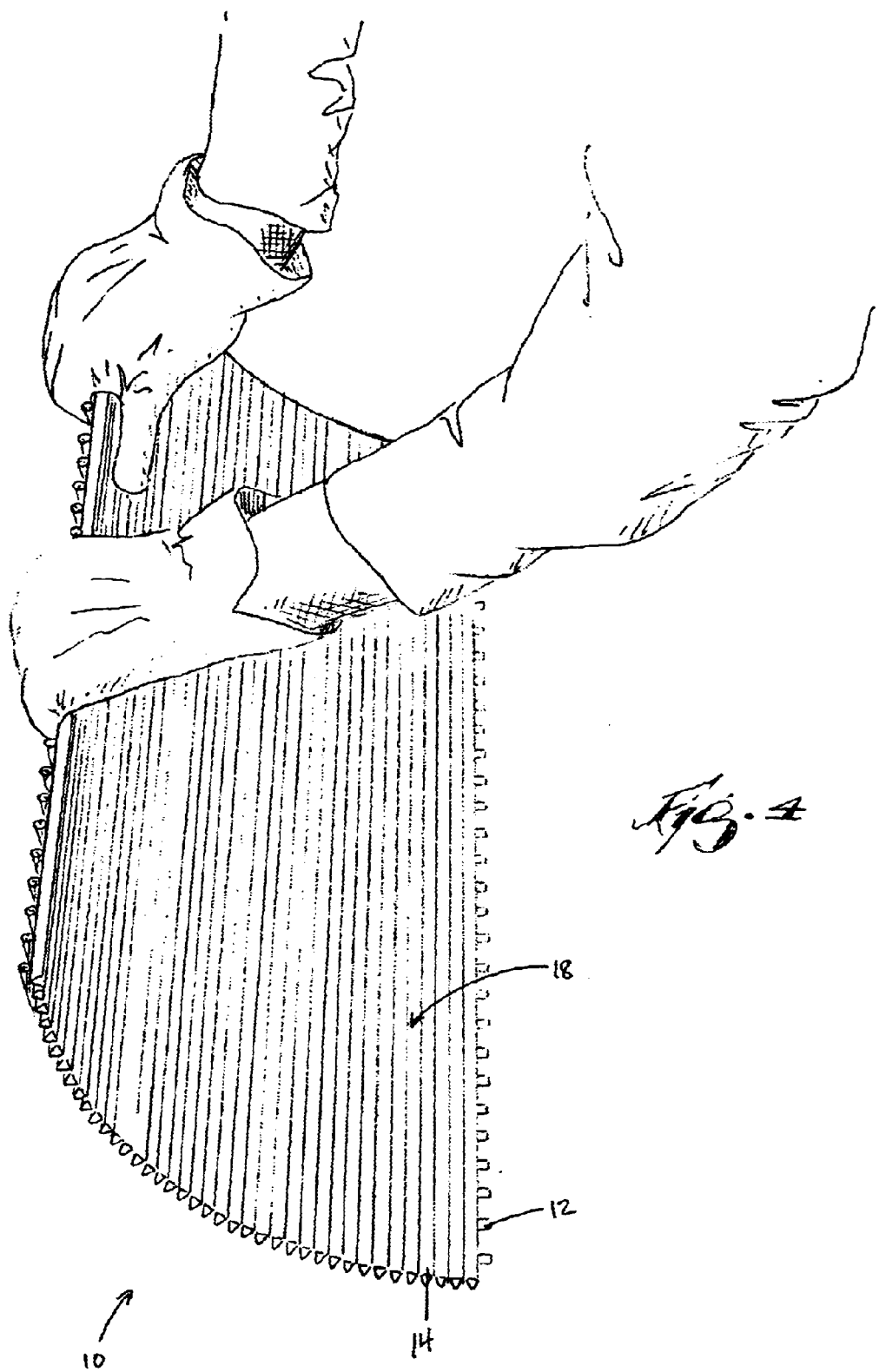
FIG. 4 is a perspective view illustrating a sheet of the screen material of FIG. 1 being shaped by hand into a generally cylindrical form wherein the filter wires run longitudinally to form an interior filtering surface of the cylinder being formed and the stranded cable runs circumferentially around an exterior of the cylinder.

For example, the sheet of screen material 10 can be formed back into a cylinder, but wherein the stranded cables 12 are shaped to extend circumferentially and the rigid triangular-shaped profile wires 14 are positioned longitudinally. FIGS. 3 and 4 illustrate the sheet of screen material 10 according to the present invention beginning to be formed in this way. The sheet of flexible screen material 10 can be rolled in either direction so that the filter wires 14 run longitudinally and form the exterior surface of the cylinder supported by the stranded cables 12 within (FIG. 3) or where the filter wires 14 run longitudinally and form the internal surface of the cylinder supported by the stranded cables 12 surrounding the filter wires 14 (FIG. 4). Referring to FIG. 3, the top faces 18 of the triangular-shaped filter wires 14 create an exterior filtering surface and, referring to FIG. 4, the top faces 18 of the filter wires 14 create an interior filtering surface.

Figure 5:
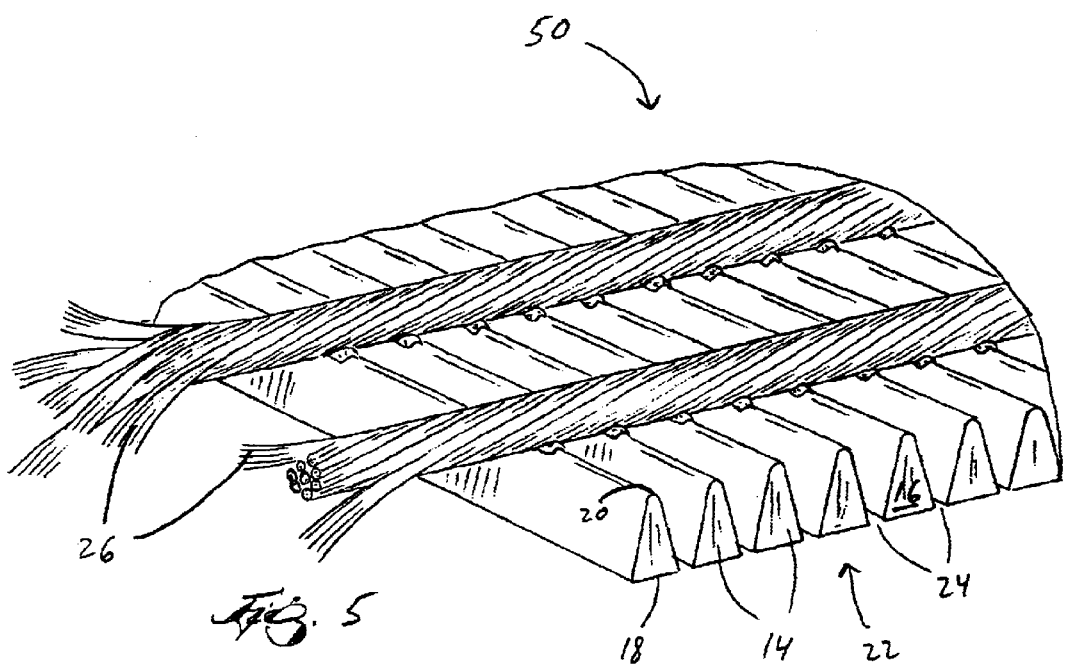
FIG. 5 illustrates a perspective view of an alternate embodiment of a sheet of screen material according to the present invention including triangular-shaped profile filter wires spaced closely together and coupled substantially perpendicularly to a series of underlying, supporting, flexible, lengths of wire rope.

In another embodiment of the present invention as shown in FIG. 5, a series of wire ropes 26 serve as the support rods underlying the filter wires 14 rather than the stranded cables 12 shown in FIGS. 1–3. As will be understood by those of ordinary skill in the art, each strand of wire rope 26 is itself made up of many individual strands, while the strands of the stranded cable 12 are not further made up of individual strands. In this way, the wire rope 26 has increased flexibility over the stranded cable 12. As a result, less force is generally required to form the sheet of flexible screen material 50 than is required to form the sheet of flexible material 10. It should be understood that any embodiment of the present invention may utilize wire rope in place of stranded cable or vice versa and still maintain the spirit and scope of the present invention.

Figure 6:
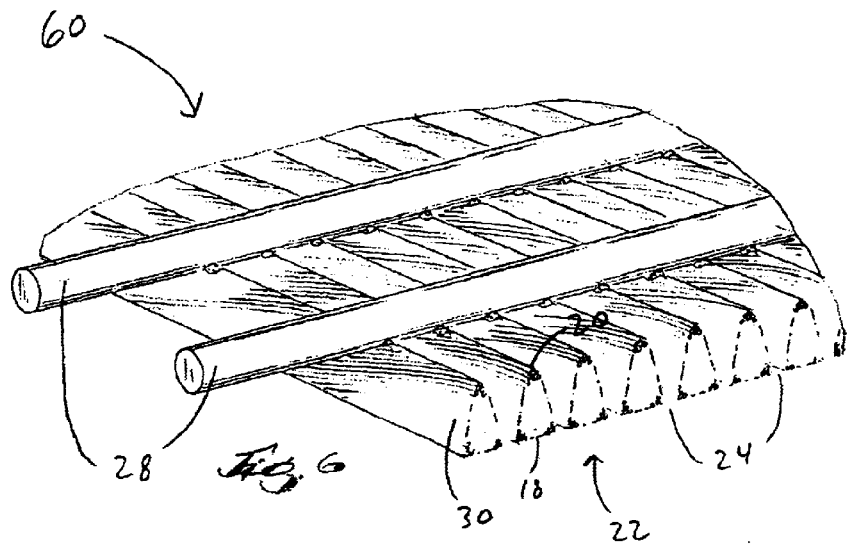
FIG. 6 illustrates a perspective view of another embodiment of a sheet of screen material according to the present invention including triangular-shaped lengths of wire rope serving as the filter wires and welded substantially perpendicularly to a series of underlying, rigid support rods.
Figure 8:
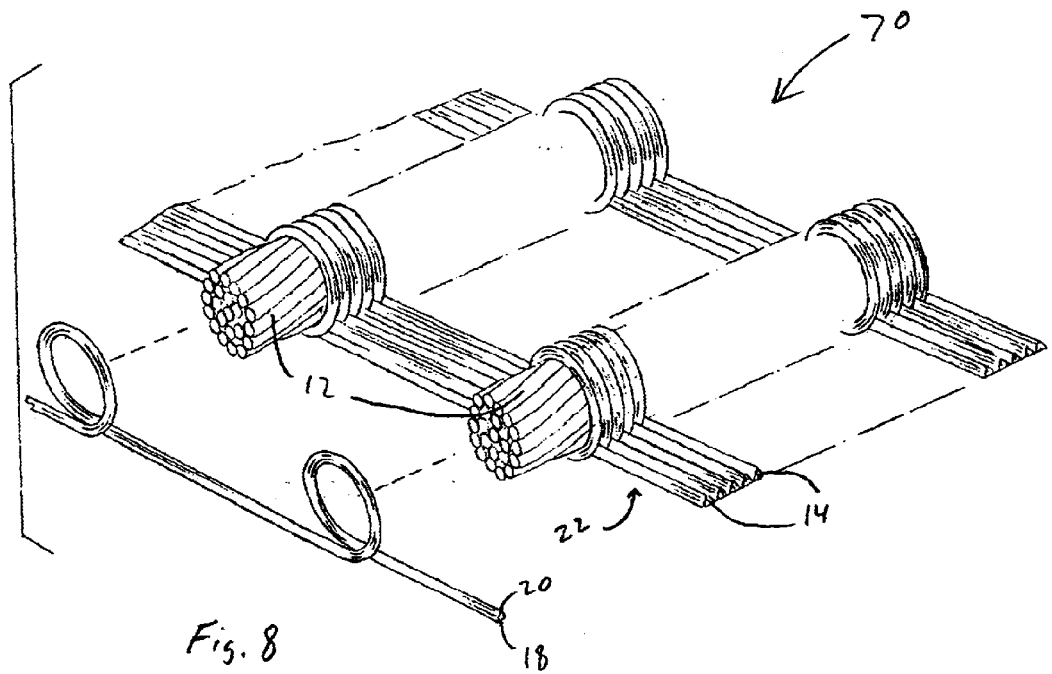
FIG. 8 is a perspective view illustrating yet another embodiment of a sheet of screen material according to the present invention wherein triangular-shaped filter wires are looped around a series of underlying stranded cable support rods.
Figure 7:
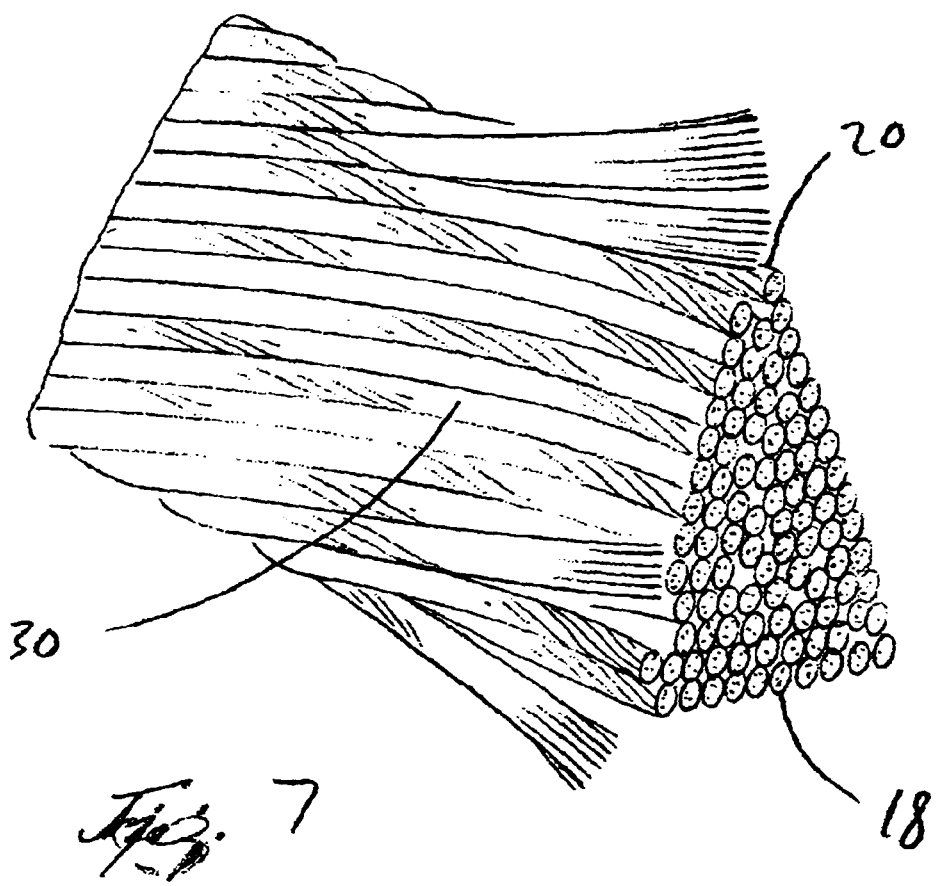
FIG. 7 is an enlarged partial view illustrating a triangular-shaped length of wire rope serving as a filter wire.

In another embodiment of the present invention, rigid longitudinal rods 28 are positioned parallel to one another in a cylindrical form and a triangular-shaped wire rope 30 is spirally wrapped around them to form the filtering surface 22 and associated filtering gaps 24 between consecutive windings of the wire rope 30. The resulting screen material 60, according to the present invention, may be used as-is in the form of the cylinder just described or may be split longitudinally and easily flattened because the flexible wire rope 30 forms the circumferential surface of the cylinder. Once split longitudinally and flattened the screen material 60 as shown in FIG. 6 results. The triangular-shaped wire rope 30 forms the filtering surface 22 and is welded substantially perpendicularly to a series of underlying, supporting, lengths of rigid longitudinal rods 28. The wire rope 30 is more clearly seen in FIG. 7. The wire rope 30 is shown as being welded to the longitudinal rods 28, but an alternate construction may include looping the filter wire 14 around the individual stranded cables 12. This "looping" construction is shown in a screen material 70 (FIG. 7) according to another embodiment of the present invention. However, the screen material 70 illustrates the stranded cables 12 as the flexible members, with rigid filtering wires 14 looped around them.

In the first embodiment described above, during the process of constructing the screen material 10, the more rigid filter wire 14 forms the circumferential surface of the cylinder and requires more extensive effort and machinery to be shaped and flattened into the above-described screen material 10. The flexibility of the screen material 10 is in the direction of the support rods 12, which run longitudinally in the cylinder. In the embodiment just described, the filter wire 30 is wire rope and, therefore, shaping the screen material in the direction along the filter wire can be done by hand because of the flexibility of the wire rope. In fact, the wire rope will tend to lay flat when the cylinder is split and generally will "spring" into a sheet of the screen material 60 on its own when the cylinder is split longitudinally.

Alternatively, if the longitudinal, rigid rods are positioned close together and then wrapped with the stranded cable or wire rope (not shown), a filtering surface is created by the longitudinal rods, surrounded by the stranded cable, without having to split the cylinder as described above. Various configurations of the screen material of the present invention in addition to those embodiments described herein will be understood by those of ordinary skill in the art. In whatever form the screen material of the present invention is utilized (sheet, cylinder, etc.), the characteristics of the stranded cable or wire rope (overall cable or rope diameter, strand diameter, spacing between strands, twisting technique, etc.) can be varied to achieve various screen characteristics. In each case, the added flexibility and greater tensile strength of stranded cable or wire rope over solid wire may be realized for the particular filtering purpose. Additionally, the stranded cable or wire rope may be shaped in various profile configurations (triangular (see FIG. 6), square, non-linear, woven, decorative, etc.) to achieve desired goals.

Yet another embodiment of the present invention (not shown) utilizes the stranded cable or wire rope for both the underlying support members and the filtering wire welded to them. According to this embodiment, stranded cables or wire ropes are positioned generally parallel to each other and in the form of a cylinder. Around this cylindrical support structure is spirally wrapped and welded another stranded cable or wire rope with consecutive windings spaced to create filtering gaps there between to allow the flow through of product, but retain a predetermined particle size.

After forming a cylinder with stranded cable or wire rope as both the underlying support members and the spirally-wrapped filtering wire, the cylinder can be cut lengthwise resulting in sheets of filtering material flexible in both the direction of the underlying support members and the filtering wires.

Sheets of screen material according to the present invention may alternatively be manufactured in a flat configuration, rather than a cylindrical configuration. A series of filtering members are simply welded "in the flat" over a series of substantially perpendicular, underlying, support members. This process eliminates the step of longitudinally splitting a cylindrical screen material and flattening it. This manufacturing process may be utilized with any of the above-mentioned configurations of a screen material according to the present invention.

In all the above-mentioned embodiments, as well as those not mentioned, the stranded cable may take any of several forms. In a preferred embodiment, the stranded cable is configured of multiple wire strands. However, as one of ordinary skill in the art will recognize, the stranded cable may also be formed of wire strands surrounding an inner core wire. As one of ordinary skill in the art will readily understand, the characteristics of welding a profile wire or another stranded cable to a stranded cable with an inner core wire will be partly governed by the relative weights of the surrounding wire strands and the heavier inner core wire. For example, the inner core wire can serve as a set point (or stop point) for penetration of the wire being welded to the stranded cable.

The screen material according to the present invention can be used in any application where conventional filtering screen material is used. For example, the present invention may be used in the following ways, among others:

Flat support grid disks, which are currently built from rigid structures, require sectioning for installation through a small man-way. Currently bolted joints must be employed, thereby creating a risk of leakage of the material being retained. The present invention can be rolled up, fed through a man-way, and unrolled inside the vessel. A complete, seamless surface with no leakage points is thus created and can be placed in the vessel without using bolting or seaming attachments.

The rigid support rods of conventional screen material evidence fatigue during high vibration applications. The present invention maintains its strength and more efficiently handles vibratory forces. The stranded cable support members of the present invention can be tensioned to provide higher frequency operating modes and greater sizing in a dewatering capacity. This application is useful in flat mining panels and rerolled cylinders for pulp and paper pressure baskets.

Traveling water screens require a flexible retention surface operating as a belt on a mechanical device. Conventional screen materials plug significantly and require high maintenance efforts. The screen material of the present invention flexes to a larger slot opening size or filtering gap while traveling over a tight radius and returns to its normal size when flat. This improves cleaning properties and capacities of the unit.

The present invention can be used in screen material applications where it is desired to have slots that can be opened using flexion of the support members or blow back. The present invention thus improves many high debris loading applications.

The present invention may be utilized for expandable well screens that can be placed in the drilling pipe as a compressed component and expanded to match the actual bore diameter using a mandrel and support core.

The present invention provides high tensile strength that is needed in extremely deep wells.

The present invention can be utilized in lightweight screen applications wherein the screen is placed through small access ports and opened rather than requiring major maintenance turnarounds using major equipment removal for access as in sugar centrifuges.

The present invention can be utilized in applications wherein wire mesh rolls are employed for repairs or wrapping of existing structures without the use of rolling equipment.

The present invention can employ an optical cable as the inner core wire for data transmission.

The present invention can be utilized to match convoluted shapes without special shaping requirements.

The present invention provides for flexible structures for thermal expansion management and rebounding.

The present invention can be applied to conveyor belts and vacuum processing belts with opening slots.

The present invention can be utilized for architectural shapes.

The present invention can be used to create centrifugal baskets that self-form to the underlying support basket shape.

The present invention can utilize a heating (resistance) cable as the inner core wire of the stranded cable to melt frazzle ice on intake screens.

The present invention can be used in "large span" flat applications (fish panels) using tensioned stranded cable that eliminates the need for heavy structural solid support rods.

Although the invention has been described in detail with reference to certain preferred embodiments, variations and modifications exist within the scope and spirit of the invention as described and defined in the following claims.

What is claimed is:

1. A screen material, comprising:
   a plurality of filter wires spaced apart and positioned substantially parallel to each other; and
   a plurality of support members spaced apart and positioned substantially parallel to each other, the plurality of support members coupled to the plurality of filter wires and running substantially perpendicularly to the plurality of filter wires, at least one of the support members comprising a flexible stranded cable.

2. The screen material of claim 1, wherein the filter wires are welded to the support members.

3. The screen material of claim 1, wherein the filter wires are wound around the support members.

4. The screen material of claim 1, wherein the filter wires are closer together than the support members.

5. The screen material of claim 4, wherein the filter wires have substantially triangular-shaped cross sections.

6. The screen material of claim 5, wherein the filter wires are less than 0.10 inches wide.

7. A screen material, comprising:
   a plurality of filter wires spaced apart and positioned substantially parallel to each other; and
   a plurality of support members spaced apart and positioned substantially parallel to each other, the plurality of support members coupled to the plurality of filter wires and running substantially perpendicularly to the plurality of filter wires, at least one of the support members comprising a wire rope.

8. The screen material of claim 7, wherein the filter wires are welded to the support members.

9. The screen material of claim 7, wherein the filter wires are looped around the support members.

10. The screen material of claim 7, wherein the filter wires are closer together than the support members.

11. The screen material of claim 10, wherein the filter wires have substantially triangular-shaped cross sections.

12. The screen material of claim 11, wherein the filter wires are less than 0.10 inches wide.

13. A screen material, comprising:
   a plurality of filter wires spaced apart and positioned substantially parallel to each other; and
   a plurality of support members spaced apart and positioned substantially parallel to each other, the plurality of support members coupled to the plurality of filter wires and running substantially perpendicularly to the plurality of filter wires, at least one of the support members being elastically deformable.

14. The screen material of claim 13, further including filter gaps between adjacent filter wires, the filter gaps being less than 0.050 inches wide.

15. The screen material of claim 14, wherein the filter wires have substantially triangular-shaped cross sections.

16. The screen material of claim 13, wherein the support members are metal and have substantially round cross sections.

17. The screen material of claim 15, wherein the support members are metal and have substantially round cross sections.

18. The screen material of claim 16, wherein the support members are stranded cables.

19. The screen material of claim 16, wherein the support members consist of wire rope.

20. A screen material, comprising:

a plurality of long, thin, spaced-apart filter members; and a plurality of long, thin, spaced-apart support members coupled transversely to the filter members, at least one of the group comprising a filter member and a support member being elastically deformable.

21. The screen material of claim 20, wherein the filter members are substantially parallel to each other.

22. The screen material of claim 21, wherein the support members run substantially perpendicularly to the filter members.

23. The screen material of claim 22, wherein the filter members have substantially triangular-shaped cross sections.

24. The screen material of claim 20, wherein the filter members are closer together than the support members.

25. A screen material, comprising:

a plurality of long, thin, spaced-apart filter members; and a plurality of long, thin, spaced-apart support members coupled transversely to the filter members, at least one of the group comprising a filter member and a support member being flexible stranded cable.

26. The screen material of claim 25, wherein the filter wires are welded to the support members.

27. The screen material of claim 25, wherein the filter wires are looped around the support members.

28. The screen material of claim 25, wherein the filter members are substantially parallel to each other.

29. The screen material of claim 28, wherein the support members run substantially perpendicularly to the filter members.

30. The screen material of claim 29, wherein the filter members have substantially triangular-shaped cross sections.

31. The screen material of claim 25, wherein the filter members are closer together than the support members.

32. A screen material, comprising:

a plurality of long, thin, spaced-apart filter members; and a plurality of long, thin, spaced-apart support members coupled transversely to the filter members, at least one of the group comprising a filter member and a support member being wire rope.

33. The screen material of claim 32, wherein the filter wires are welded to the support members.

34. The screen material of claim 32, wherein the filter wires are looped around the support members.

35. The screen material of claim 32, wherein the filter members are substantially parallel to each other.

36. The screen material of claim 35, wherein the support members run substantially perpendicularly to the filter members.

37. The screen material of claim 36, wherein the filter members have substantially triangular-shaped cross sections.

38. The screen material of claim 32, wherein the filter members are closer together than the support members.

39. A screen material, comprising:

a plurality of support members positioned substantially parallel to each other and spaced apart to define a cylindrical shape defining a cylinder surface, at least one of the support members is elastically deformable; and a filter wire wound about the cylinder surface to form a plurality of adjacent spaced-apart windings around the support members.

40. The screen material of claim 39, wherein the support members are stranded cables.

41. The screen material of claim 39, wherein the support members are wire ropes.

42. The screen material of claim 39, wherein the windings are more closely spaced than the support members.

43. The screen material of claim 42, wherein the filter wire has a substantially triangular-shaped cross section.

44. The screen material of claim 43, wherein the filter wire is less than 0.10 inches wide.

45. The screen material of claim 39, the screen material further includes filter gaps between adjacent windings, the filter gaps being less that 0.050 inches wide.

46. A method for manufacturing a screen material, the screen material comprising a plurality of elastically deformable support members and a filter wire, the method comprising:

positioning the elastically deformable support members substantially parallel to each other such that they define a cylinder having a cylinder surface; and winding the filter wire about the cylinder surface to form a repeating sequence of adjacent spaced-apart windings around the elastically deformable support members resulting in a screen cylinder.

47. The method of claim 46, further comprising:

cutting the screen cylinder longitudinally between adjacent support members; and opening the cylinder to generally form a planar surface.

48. The method of claim 46, wherein the elastically deformable support members are stranded cables.

49. The method of claim 46, wherein the elastically deformable support members are wire ropes.

50. A method of manufacturing a screen material, the screen material comprising a plurality of elastically deformable support members and a plurality of filter wires, the method comprising:

positioning the elastically deformable support members spaced apart and substantially parallel to each other substantially in a single plane;

positioning the filter wires spaced apart and substantially parallel to each other and substantially transverse to the elastically deformable support members; and welding the filter wires to the support members.

51. The method of claim 50, wherein the filter wires lie substantially in a single plane.

52. The method of claim 50, wherein the elastically deformable support members are stranded cables.

53. The method of claim 50, wherein the elastically deformable support members are wire ropes.

* * * * *